E. W. PRICHETT.
Wagon-Brake.
No. 221,252.  Patented Nov. 4, 1879.
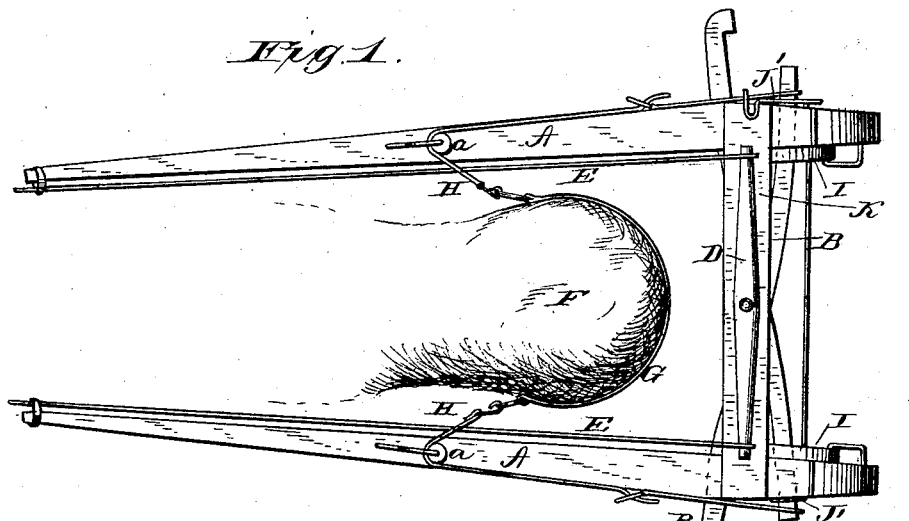
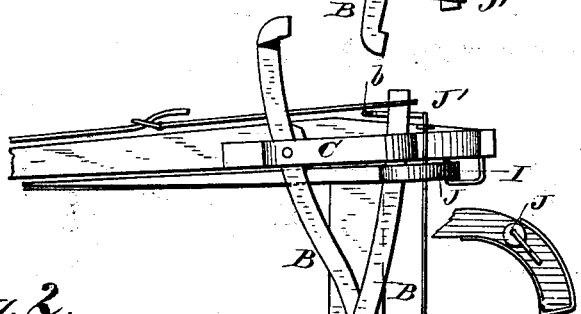
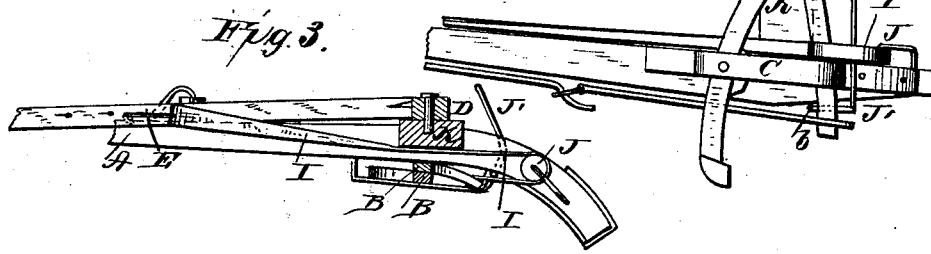
WITNESSES
F. L. Ourand
John O'Donoghue
INVENTOR
Enoch W. Prichett
By H. F. Ennis
ATTORNEY.

UNITED STATES PATENT OFFICE.

ENOCH W. PRITCHETT, OF CATARACT, INDIANA.

IMPROVEMENT IN WAGON-BRAKES.

Specification forming part of Letters Patent No. 221,252, dated November 4, 1879; application filed August 26, 1879.

*To all whom it may concern:*

Be it known that I, ENOCH W. PRITCHETT, of Cataract, in the county of Owen and State of Indiana, have invented certain new and useful Improvements in Buggy and Hack Brakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a plan view of a buggy and hack brake embodying the improvements in my invention. Fig. 2 is a bottom plan of the same, and Fig. 3 is a detail view of a side elevation.

The invention relates to buggy and hack brakes; and it consists in the improvement in the construction of the same hereinafter fully described, and particularly pointed out in the claim.

Referring to the drawings, A represents the thills. B B designate levers pivoted in bearings C C, secured to the under side of the thills, as shown. D designates the single tree, and E E the tugs, (shown connected to the single-tree D.)

The outer ends of the levers B B are provided with brake-shoes, which, when operated, come in contact with the tires of the front wheels of the vehicle, and are again released by mechanism hereinafter explained.

F designates the rump of the animal, and G the breeching in contact therewith. The breeching G is connected at each end to a tug or strap, H, which passes forward over a sheave, *a*, in bearings on the upper side of the thills, and back to the plain ends of the levers B B on the outsides of the thills. Other tugs or straps, I I, are connected to the levers B B immediately on the inside of the thills, and pass backward over sheaves J J in bearings on the inside of the thills, and forward beyond the sheaves *a a*, where they are connected to the main tugs E E.

J' designates a crank-shaft placed back of the cross-bar K of the thills, having a hook, *b*, at each end, adapted to engage with and retain the plain ends of the levers B B, or to release them, at pleasure.

The operation of the invention is very simple. When the hooks *b b* are not engaged with the levers B B the back motion of the animal or the forward motion of the vehicle exerted upon the breeching of the harness will cause the brake-shoes at the ends of the levers B B to come in contact with the front wheels and brake them when making a descent. The brakes are drawn off the wheels when the animal moves forward by means of the short tugs I I, which are secured to the main tugs. When the crank-shaft is turned down, which may be done either with the foot or the whipstock, the brakes cannot be operated, as the levers B B are held by said hooks.

Having thus fully described my invention, what I claim as new and useful, and desire to secure by Letters Patent, is—

In a brake for vehicles, the levers B B, provided at one end with brake-shoes, and connected at the other to auxiliary tugs H, passing over sheaves *a a* and connecting with the breeching G, in combination with the tugs I I, connected to the levers B B and tugs E E, and passing over the sheaves J J, and the crank-shaft J', having hooks *b b*, substantially as and for the purposes set forth.

In testimony that I claim the foregoing I have hereunto set my hand this 26th day of August, 1879.

ENOCH W. PRITCHETT.

Witnesses:
 THEO. MUNGEN,
 JOHN O'DONNOGHUE.